C. AND R. NUHRING.
CABINET HOSE RACK.
APPLICATION FILED JUNE 24, 1918.
1,354,680.
Patented Oct. 5, 1920.
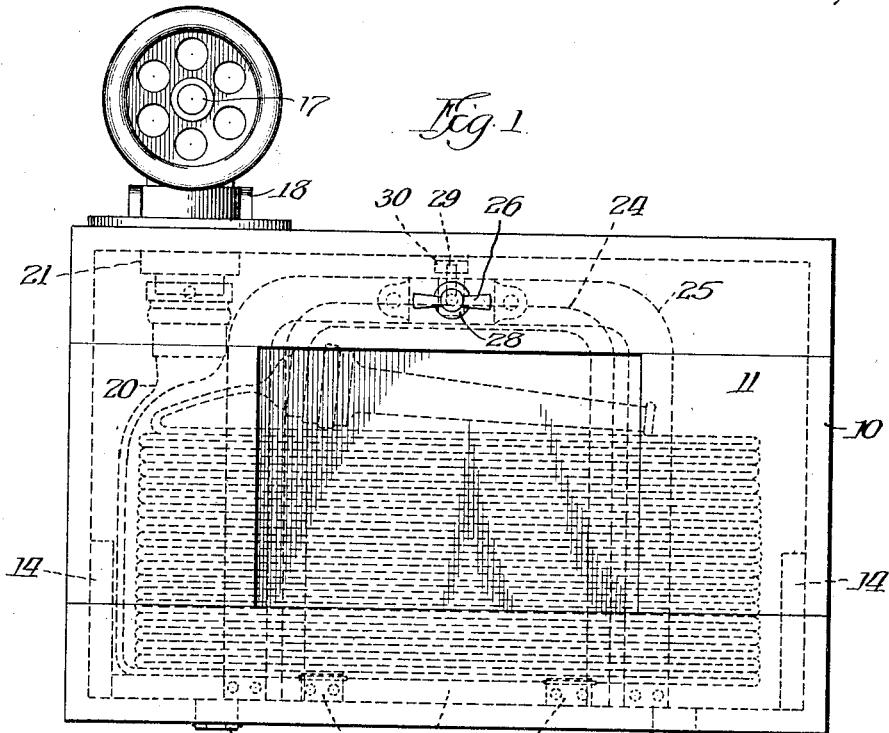
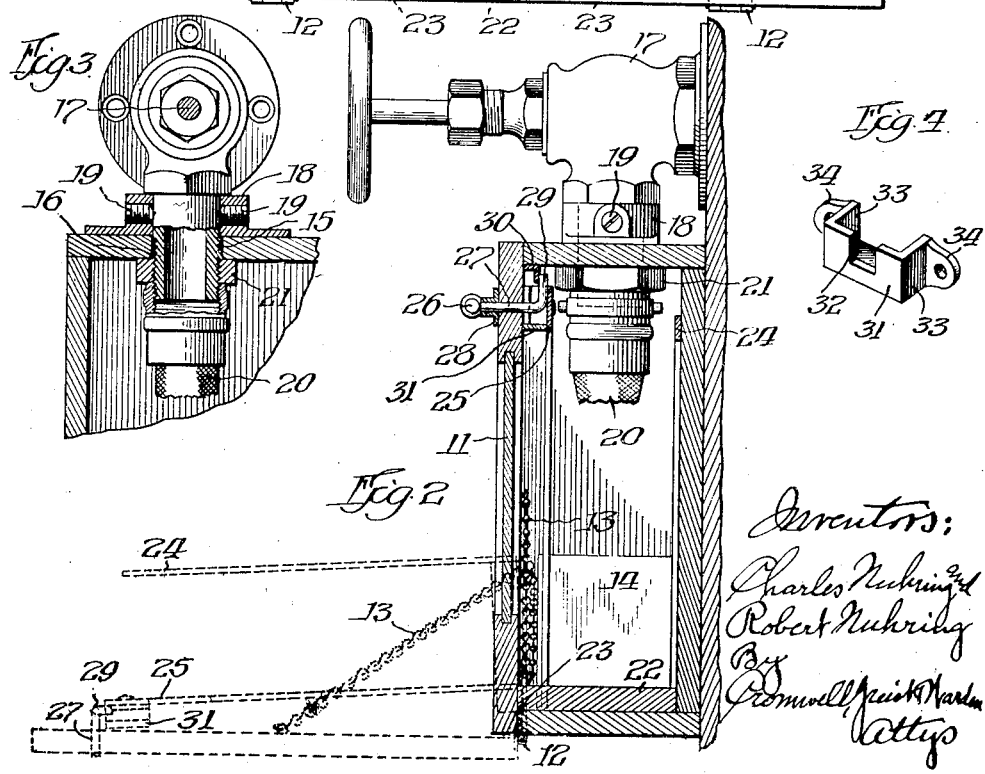

UNITED STATES PATENT OFFICE.

CHARLES NUHRING AND ROBERT NUHRING, OF CINCINNATI, OHIO.

CABINET HOSE-RACK.

1,354,680.  Specification of Letters Patent.  Patented Oct. 5, 1920.

Application filed June 24, 1918. Serial No. 241,522.

*To all whom it may concern:*

Be it known that we, CHARLES NUHRING and ROBERT NUHRING, citizens of the United States, residing at Cincinnati, in the county of Hamilton and State of Ohio, have invented certain new and useful Improvements in Cabinet Hose-Racks, of which the following is a specification.

The present invention relates to hose supporting devices, and more particularly has to do with hose racks as distinguished from reels.

The construction of hose racks commonly employed exposes the hose to accumulation of dust and dirt. Especially is this true where the hose is racked in factories, hallways and similar localities, and when so exposed the hose is subjected also to the deteriorating effect of the atmosphere. In many instances this causes greater injury to the hose than the wear thereon from actual use. To overcome these objections is the primary object of the present invention, and it seeks, therefore, to provide a novel construction of hose rack possessing the characteristics of a cabinet, thereby to house the hose and protect the same from dust and dirt deposits as well as from the air usually circulating in and about the racked hose. This permits new hose, when first placed in position on a rack, to remain clean, thus prolonging the life of the hose and avoiding its deterioration by reason of the conditions to which it is usually subjected by the exposed rack.

The invention further contemplates the provision of a hose cabinet in which is incorporated a novel form of rack or support for the hose which is so arranged in relation to the cabinet as to be readily accessible for placing the hose thereon and the removal of the latter therefrom when occasion may require. The construction is such that by the single act of opening the cabinet door or closure the rack may be moved to hose-discharging position, whereby to permit the expeditious unracking of the hose without liability of its becoming kinked or caught; or if access only to the cabinet is desired, without removal of the hose, this also may be readily accomplished.

Furthermore, the invention also aims to provide an improved form of rack of the nature described which may be easily adapted to present-day equipment, thus affording efficient means for housing hose now subjected to the objectionable conditions outlined without material modification of the equipment.

Having these general objects in view, and others which will appear as the nature of the improvements is better understood, the invention consists substantially in the novel construction, combination and arrangement of parts hereinafter fully described, illustrated in the accompanying drawings and finally pointed out in the appended claims. It is to be understood, however, that the present exemplification of the invention is but one embodiment thereof and is to be taken in an illustrative, and not a restrictive, sense. In the drawings—

Figure 1 is a front elevation of a cabinet hose rack constructed in accordance with the present invention, dotted lines indicating the normal position of the hose and rack proper when the cabinet is closed;

Fig. 2 is a vertical transverse sectional view thereof, the hose being removed from the rack;

Fig. 3 is a detail sectional view illustrating the means for attaching the cabinet to the depending nipple of a water-controlling valve; and Fig. 4 is a detail perspective view of the latch coupling carried by the rack proper.

Referring now in detail to the accompanying drawings, the numeral 10 designates the cabinet of the hereindescribed rack, which cabinet is in the form of a rectangular housing having one of its sides entirely open, a door 11 being provided at said open side for closing the cabinet, the door being hinged to the lower edge of the cabinet, as at 12, and thus mounted for swinging downwardly when it is desired to open the the cabinet. At the limit of its downward movement it assumes a horizontal position, as illustrated by dotted lines in Fig. 2, and in this horizontal position the door 11 is sustained by supporting chains 13 connected at one of their ends to said door, the other ends of said chains 13 being connected to the inner side of the ends of the cabinet 10. The door 11 may be either of solid construction, or it may be provided with a glass panel to permit inspection of the interior of the cabinet without the necessity of opening the door.

As a convenient means of supporting the cabinet 10 the latter is provided in its top and adjacent to one end thereof with an opening 15 designed to receive the depending nipple 16 connected to an angle valve 17 by which the flow of the water is controlled. Surrounding the opening 15, and arranged at the exterior of the cabinet 10, is a flanged collar 18 provided at opposite points with screw-threaded apertures for the reception of a plurality of set screws 19. The inner ends of these screws 19 impinge against the nipple 16, and when said screws are tightened sufficiently it will be seen that they bind the collar 18 in locked engagement with said nipple. By referring to Fig. 3, it will also be noted that the nipple 16 is of sufficient length to project into the cabinet 10, the inner extremity of said nipple having applied thereto the coupling of the hose 20. A locking nut 21 also surrounds the inner end of the nipple 16, and said nut 21 bears against the under side of the top of the cabinet 10, and in coöperation with the flanged sleeve 18 serves to clamp the cabinet 10 in locked position on said nipple 16. It is to be noted in this connection that while the angle valve 17 is at the exterior of the cabinet 10 it will be obvious that by properly dimensioning the cabinet 10 the latter could be supported from the angle valve 17 with said valve concealed within this cabinet. In lieu of the angle valve 17 a gate valve, or valve of any other approved construction, might be substituted therefor.

Within the cabinet 10 is arranged the rack proper. This comprises an elongated supporting base 22, said base being seated upon the lower side of the cabinet 10, and a plurality of hinges 23 is arranged at the outer edge of said base 22 and connected to the bottom of the cabinet 10, whereby to permit the base 22 to swing outwardly and to the substantially vertical position illustrated by dotted lines in Fig. 2. The opposite edges of the base 22 are provided with inverted U-shaped frames 24 and 25, the latter being of slightly greater dimension than the former. The frames 24 and 25 constitute the sides of the rack proper, and between said frames the hose 20 is designed to be threaded in folded loops in the characteristic manner of storing hose on supporting racks. By providing the frames 24 and 25 it will be apparent that the folds of the hose are confined upon the base 22 and the latter may be tilted on its hinges 23, either to open or closed position without derangement of said folds. When the rack proper is moved to the dotted line position of Fig. 2, or that position which may be termed the open position of the rack proper, the hose may be readily removed therefrom without liability of kinking or being caught. This permits removal of the hose in a more expeditious manner than in the usual type of swinging rack, and likewise with greater freedom of movement of the hose.

The door 11 of the cabinet 10 is provided with an operating handle 26 the shank 27 of which passes loosely through the door 11, and is capable of limited longitudinal movement through said door. The extent of inward movement of the shank 27 is controlled by a collar 28 which surrounds said shank and bears against the outer face of the door 11 when the shank 27 is moved to its innermost limit. The inner end of the shank 27 is bent at a right angle to form a latch 29, and said latch 29 is adapted to engage a keeper 30, preferably formed of angle iron, and secured at the inner side of the top of the cabinet 10 at approximately a point midway the ends thereof. When the door 11 is closed, and the handle 26 properly manipulated, the latch 29 will occupy a position in rear of the keeper 30, and when the handle 26 is rotated so that the latch 29 will be moved toward the top of the cabinet 10 said latch will pass in rear of the keeper 30, thereby locking the door 11 against outward movement.

The handle 26 with its latch 29 serves not only to lock the door 11 in closed position, but it also serves as the actuating means for operating the rack proper both in moving the same to its open position, and likewise in returning the same to its closed position, or that within the cabinet 10. To permit this dual functioning of the handle 26 a latch coupling 31 is employed. This coupling is provided with a U-shaped notch 32 in its upper edge and has offset ends 33 which terminate in attaching flanges 34 whereby the latch coupling is riveted, or otherwise suitably secured, to the upper bar of the frame 25. The position of the latch coupling 31 on the bar 25 is substantially midway the ends of said frame 25 in order that the notch 32 may be opposite to the latch 29 of the handle 26, thereby permitting the latch to readily enter the notch 32 when the door 11 is moved to its closed position. By reason of the offset ends of the latch coupling 31 the body portion thereof is positioned a sufficient distance from the upper bar of the frame 25 to permit the inward and outward sliding movement of the shank 27 above referred to, thereby permitting the latch 29 to be properly manipulated with respect to the keeper 30. When the latch 29 is swung downwardly out of engagement with the keeper 30 it occupies a position within the latch coupling 31 to the rear of the body portion of the coupling, and at either side of the notch 32, in accordance with the direction in which the latch 29 may be rotated. The latch 29 is, therefore, in a horizontal position, and on outward pull being exerted on the handle 26 to swing the door 11 outwardly the latch 29 engages the body portion of the coupling 31, thereby causing the rack proper to swing outwardly also with the door 11 and down to the horizontal position illustrated by the dotted lines in Fig. 2. By a reverse movement the rack proper is restored to its position within the cabinet and the door 11 likewise closed. If it be desired merely to open the door 11 without removing the rack proper from the cabinet, it will be understood that after the latch 29 is swung downwardly to release the same from its position in rear of the keeper 30 a slight outward pull on the handle 26 will advance the latch 29 to a point in front of the keeper 30, whereupon on rotation of the handle 26 the latch 29 will be brought into vertical alinement with the notch 32, and thus in a position to readily pass out through said notch. This enables the door 11 to be opened without any outward movement of the rack proper.

In the use of the herein described cabinet rack the same is attached to the depending nipple of the angle valve 17 through the instrumentalities hereinbefore described, and is thus supported from said valve. By coupling the rack proper to the door 11 for outward movement therewith, in the manner hereinabove described, the rack proper may be moved to the dotted line position of Fig. 2, whereupon the hose may be folded into position thereon, and then by closing the door 11, in the manner also above described, the rack with its looped hose is moved into the cabinet. The simpler movement is, of course, the joint outward movement of the rack proper and the door 11, inasmuch as it is merely necessary to rotate the handle 26 a sufficient distance to release the latch 29 from its rear position with respect to the keeper 30. Outward pull, exerted on the handle 26, causes both the rack proper and the door 11 to swing to open position, and the hose may be quickly removed from the rack proper. Thus it will be seen that with a simple movement the cabinet may be opened, the rack proper drawn to its hose-discharging position, and the hose quickly removed therefrom. The use of the invention, therefore, does not tend to retard removal of the hose when the same is required under the emergency conditions.

As before stated, the present invention lends itself to use with present-day equipment without material modification thereof. Hose used with the ordinary exposed rack can be readily transferred to the herein described cabinet rack, the latter being readily applied to the depending nipples of standard stand pipe valves and supported thereon, thus providing for protecting the hose from accumulations of dirt and dust, and likewise from the deteriorating effects of the atmosphere surrounding the hose. This avoids the expense of purchasing new hose when installing the present invention.

We claim:

1. A hose rack of the class described, comprising a housing, a rack proper hingedly connected to said housing, a door hingedly connected to said housing independently of the hinged connection of the rack proper therewith, and means for swinging the rack proper to open and closed positions when opening and closing the door.

2. A hose rack of the class described, comprising a housing, a rack proper hingedly connected to said housing, a door for said housing, and coöperating means between the door and rack proper for swinging the rack proper to open and closed positions when opening and closing the door, said means also serving to lock the door of the housing in closed position.

3. A hose rack of the class described, comprising a housing, a rack proper hingedly mounted therein, a door for said housing, and means carried by the door and adapted for detachable connection to said rack proper for actuating the latter.

4. A hose rack of the class described, comprising a housing, a rack proper hingedly mounted therein, a door for said housing, a locking device carried by said door for locking the latter in closed position, and means carried by said rack proper adapted to be engaged by said locking device, whereby to move the rack proper to open and closed positions when opening and closing the door.

5. A hose rack of the class described, comprising a housing, a rack proper arranged in said housing and hingedly mounted adjacent to one side thereof, a door hingedly connected to said housing adjacent to the hinged portion of said rack proper, a locking device carried by said door, and means adapted to be engaged by said locking device, whereby to move the rack proper to open and closed positions when opening and closing the door.

6. A hose rack of the class described, comprising a housing, a rack proper arranged therein and having one of its edges hingedly connected to one of the edges of said housing, a door for said housing hingedly connected thereto at a point adjacent to the hinged connections of the hose rack proper therewith, a locking device for said door, and means carried by said rack proper adapted to be engaged by said locking device, whereby to move the rack proper to open and closed positions when opening and closing the door.

7. A hose rack of the class described, comprising a housing, a rack proper arranged therein, said rack proper being mounted for relative movement with respect to said housing, whereby to move the same into and out of the housing, a door for said housing, a locking device for said door, and a coupling device between the rack proper and said locking device, whereby to connect the rack proper for simultaneous movement with the door or to permit movement of the door independently of said rack proper.

8. A hose rack of the class described, comprising a housing, a rack proper arranged therein and adapted for relative movement with respect to said housing, a door for said housing, a locking device for said door, a coupling device associated with said rack proper and adapted to be engaged by said locking device, whereby to cause the rack proper to move simultaneously with the door or to permit movement of the door independently of said rack proper, and a keeper carried by said housing for engagement by said locking device, whereby to lock the door in closed position.

9. A hose rack of the class described, comprising a housing, a rack proper arranged therein and mounted for movement relatively to said housing, a keeper arranged in said housing, a locking device carried by the door of the housing and adapted to engage said keeper to lock the door in closed position, and means carried by said rack proper and also adapted to be engaged by said locking device to couple the rack proper with the door for simultaneous movement.

10. A hose rack of the class described, comprising a housing, a rack arranged in said housing and mounted for movement relatively thereto, a door for said housing, a locking device carried by said door and having limited movement in relation thereto, a keeper carried by said housing and adapted to be engaged by said locking device to hold the door in closed position, and a coupling member carried by said rack proper and adapted to be engaged by said locking device, whereby to couple the rack proper for simultaneous movement with the door.

11. A hose rack of the class described, comprising a housing, a rack proper arranged therein and mounted for movement relatively thereto, a door for said housing, a rotatable locking device carried by said door and provided with a latch, a keeper carried by said housing and adapted to be engaged by said latch to hold the door in closed position, and a notched latch coupling carried by said rack proper the notch of which is adapted to receive the latch of said coupling device, said coupling device having limited movement with respect to said door, whereby to position the latch thereof in relation to said keeper to engage the same, and likewise to be free from such engagement and to engage the latch coupling, whereby to couple the rack proper for simultaneous movement with said door.

12. A hose rack of the class described, comprising a housing, a rack proper hingedly mounted therein, said rack proper being provided with oppositely disposed frame members for supporting the folded hose thereon, a door for said housing, a rotatable locking device carried by said door, a keeper carried by said housing and adapted to be engaged by said rotatable locking device to hold the door in closed position, and a notched latch coupling carried by one of said frame members, the notch of said latch coupling being mounted in opposite relation to said locking device when the door is closed, whereby the latch of said locking device is designed to pass through said notch and into position for engagement with the keeper, said locking device having limited movement with respect to said door, whereby the same may be freed from engagement with said keeper and moved to engaging position with said latch coupling and thereby couple the latch proper to said door for simultaneous movement therewith.

13. A hose rack of the class described, comprising a housing, hose-supporting means arranged therein, said housing being provided with an opening adapted to receive a supporting nipple carried by a water supply valve, and means associated with said housing for engagement with said nipple, whereby to lock the housing in supported relation to the nipple.

14. In a hose rack of the class described, the combination with a housing provided with an opening, and hose-supporting means arranged in said housing, of a water supply valve, a nipple associated with said water supply valve, a sleeve arranged at the exterior of said housing and adapted to surround said nipple and means arranged at the interior of said housing and engaging the nipple, whereby to clamp the housing to the nipple for sustaining the housing in supported relation thereto.

15. In a hose rack of the class described, the combination with a housing provided with an opening, and hose-supporting means arranged in said housing, of a nipple carried by a water supply valve, a sleeve carried by said housing and arranged at its exterior, said sleeve surrounding said nipple, means for locking the sleeve in engagement with said nipple, and a locking nut arranged at the interior of said housing and mounted on said nipple, said locking nut serving to clamp the housing in locked relation to the said nipple for sustaining the housing in supported relation thereon.

CHARLES NUHRING.
ROBERT NUHRING.

Witnesses:
ADAM LOTZ,
EDWARD M. GRIMES.